United States Patent
King et al.

(10) Patent No.: US 12,337,923 B2
(45) Date of Patent: Jun. 24, 2025

(54) STEERING BEARING ASSEMBLY WITH INTERNAL CABLE ROUTING

(71) Applicant: King Cycle Group, Inc., Portland, OR (US)

(72) Inventors: Christopher Dale King, Portland, OR (US); Ryan Matthew Salisbury, Portland, OR (US); Kenneth Alan Silva, Vancouver, WA (US); Kevin Nelson, Ogden, UT (US); Scott Neperud, Ogden, UT (US)

(73) Assignee: KING CYCLE GROUP, INC., Portland, OR (US)

( * ) Notice: Subject to any disclaimer, the term of this patent is extended or adjusted under 35 U.S.C. 154(b) by 685 days.

(21) Appl. No.: 17/565,142

(22) Filed: Dec. 29, 2021

(65) Prior Publication Data

US 2022/0204118 A1    Jun. 30, 2022

Related U.S. Application Data

(60) Provisional application No. 63/131,723, filed on Dec. 29, 2020.

(51) Int. Cl.
*B62K 21/06* (2006.01)
*B62J 11/10* (2020.01)
*B62K 19/32* (2006.01)

(52) U.S. Cl.
CPC .............. *B62K 21/06* (2013.01); *B62J 11/10* (2020.02); *B62K 19/32* (2013.01)

(58) Field of Classification Search
CPC ...................................................... B62K 1/06
See application file for complete search history.

(56) References Cited

U.S. PATENT DOCUMENTS

| | | |
|---|---|---|
| 3,984,142 A | 10/1976 | Valkenburgh |
| 4,102,219 A | 7/1978 | Plamper |
| 4,326,728 A | 4/1982 | Tatch |
| 4,466,629 A | 8/1984 | Sinyard |
| 4,585,246 A | 4/1986 | Diekman et al. |
| 4,768,798 A | 9/1988 | Reed et al. |
| 4,915,404 A | 4/1990 | Chonan |
| 4,917,397 A | 4/1990 | Chonan |
| 4,930,798 A | 6/1990 | Yamazaki et al. |
| 4,974,864 A | 12/1990 | Giocastro |
| 5,095,770 A | 3/1992 | Rader, III |
| 5,251,995 A | 10/1993 | Chi |
| 5,275,067 A | 1/1994 | Lew |

(Continued)

FOREIGN PATENT DOCUMENTS

| | | | | |
|---|---|---|---|---|
| DE | 102020102826 A1 | * | 12/2020 | ............ B62J 11/10 |
| DE | 102023114374 A1 | * | 1/2024 | ............ B62J 11/10 |

(Continued)

*Primary Examiner* — Kevin Hurley
(74) *Attorney, Agent, or Firm* — Miller Nash LLP

(57) ABSTRACT

A bicycle steering bearing assembly includes features for internal routing of actuator cables. Apertures through the elements of the steerer bearing assembly are configured to provide for the maximum actuator cable size while providing uniform application of forces to the steerer tube and upper bearing. Such apertures may be angled or partially angled from vertical, and may be or may include tapered sections. The apertures may also include a relief feature.

11 Claims, 13 Drawing Sheets

(56) References Cited

U.S. PATENT DOCUMENTS

| | | |
|---|---|---|
| 5,319,993 A | 6/1994 | Chiang |
| 5,387,255 A | 2/1995 | Chiang |
| 5,605,076 A | 2/1997 | Wu |
| 5,681,119 A | 10/1997 | Marui |
| 5,775,709 A | 7/1998 | Chen |
| 6,126,323 A | 10/2000 | Tange |
| 6,167,780 B1 | 1/2001 | Chen |
| 6,220,398 B1 | 4/2001 | Wu |
| 6,343,806 B1 | 2/2002 | Lee |
| 6,416,071 B2 | 7/2002 | Marui |
| 6,892,604 B2 | 5/2005 | Tison et al. |
| 6,983,949 B2 | 1/2006 | Ueno et al. |
| 7,000,936 B2 | 2/2006 | Schmider |
| 7,017,929 B2 | 3/2006 | Horiuchi |
| 7,192,044 B2 | 3/2007 | Ueno |
| 7,396,032 B2 | 7/2008 | Horiuchi |
| 7,566,065 B2 | 7/2009 | Fukui |
| 7,591,474 B1 | 9/2009 | French |
| 7,837,212 B2 | 11/2010 | D'Aluisio |
| 7,854,442 B2 | 12/2010 | Onogi et al. |
| 7,891,687 B2 | 2/2011 | Schmider |
| 7,976,045 B2 | 7/2011 | Lane |
| 8,181,980 B1 | 5/2012 | Moore |
| 8,302,981 B1 | 11/2012 | Ma |
| 8,662,517 B2 | 3/2014 | King et al. |
| 8,684,386 B2 | 4/2014 | Matthews et al. |
| 9,056,646 B1 | 6/2015 | D'Aluisio et al. |
| 9,096,287 B2 | 8/2015 | Shadwell |
| 9,242,692 B2 | 1/2016 | Nago |
| 9,409,618 B2 | 8/2016 | Lanz |
| 9,446,812 B2 * | 9/2016 | Nago ................ B62K 21/12 |
| 9,457,859 B2 | 10/2016 | Strien et al. |
| 9,701,293 B2 | 7/2017 | D'Aluisio et al. |
| 10,293,879 B1 | 5/2019 | Killing et al. |
| 10,926,827 B2 * | 2/2021 | Süsse ................ B62J 11/13 |
| 2011/0121538 A1 | 5/2011 | Giroux |
| 2019/0092417 A1 | 3/2019 | Süsse |

FOREIGN PATENT DOCUMENTS

| | | | | |
|---|---|---|---|---|
| DE | 202023106506 U1 * | 1/2024 | ............ | B62J 11/19 |
| DE | 202023106510 U1 * | 1/2024 | ............ | B62J 11/10 |
| EP | 3782887 A1 * | 2/2021 | ............ | B62J 11/13 |
| WO | WO-2023006153 A1 * | 2/2023 | ............ | B62K 21/06 |

* cited by examiner

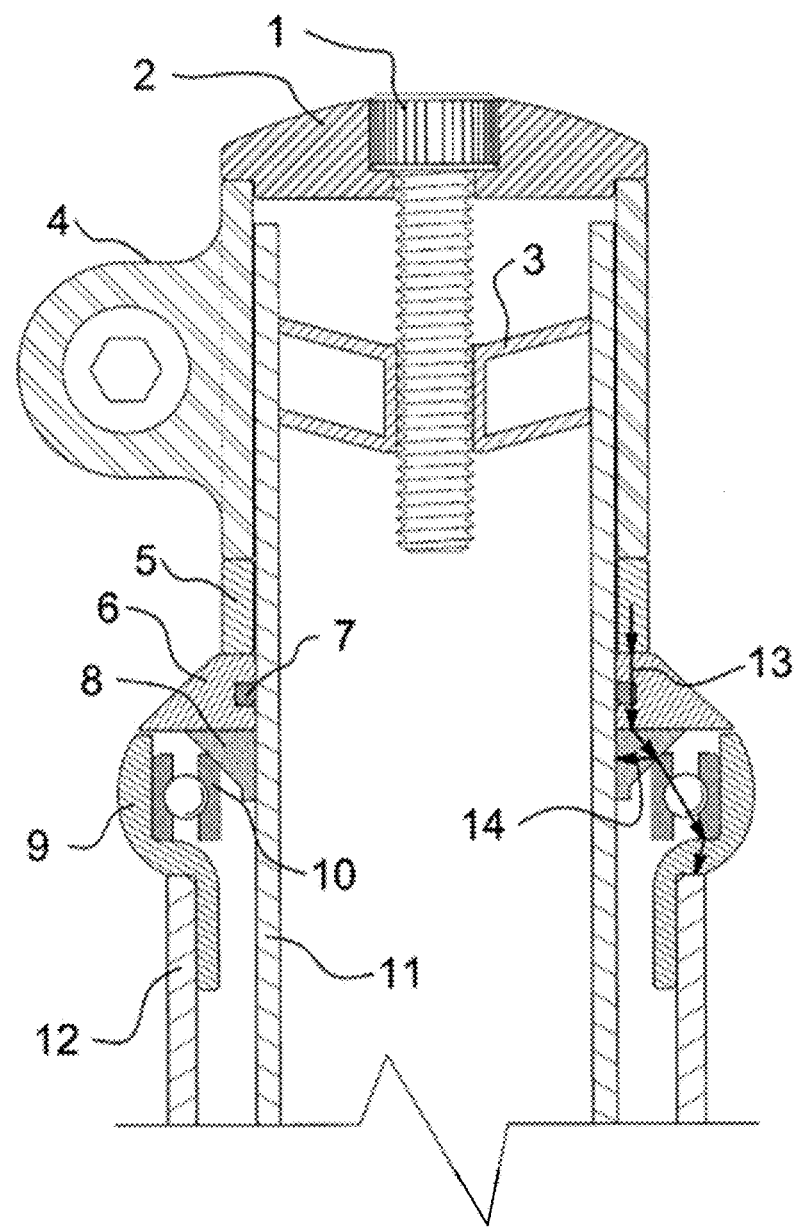
Fig. 1 (Conventional)

STEERING BEARING ASSEMBLY WITH INTERNAL CABLE ROUTING

CROSS-REFERENCE TO RELATED APPLICATIONS

This disclosure is a non-provisional of and claims benefit from U.S. Provisional Patent Application 63/131,723, entitled STEERING BEARING ASSEMBLY WITH INTERNAL CABLE ROUTING, filed Dec. 29, 2020, which is incorporated by reference herein.

TECHNICAL FIELD

This disclosure relates to bicycle steering assemblies, and, more particularly to a bicycle steering assembly having internal cable routing.

BACKGROUND

In many bicycles, the rider changes gears by moving levers that are attached to derailleur cables. The rider adjusts the levers, which in turn retracts or extends internal derailleur cables relative to the cable housing. This retraction or extension controls the derailleur to position a chain into the desired front or rear sprocket, which is called gearing. Typical bicycles include separate control levers and cables for each of a front and a rear derailleur. Similarly, the rider controls front and rear braking by moving a selected braking lever, which in turn is attached to a braking cable. Generally, front and rear brakes are controlled through separate braking systems. Both the derailleur controls and braking controls are usually mounted within reach of the rider's hands—on or near the handlebars. Thus, in the typical configuration, a bicycle includes four cables that are routed from near the rider's hands to the derailleur and braking components. Sometimes additional cables, such as an electrical cable for various instruments, are also routed on the bicycle. Such instruments may include, for example, a speedometer that measures speed of the bicycle and a cadence meter that measures the rider's pedaling rate.

Routing the brake, derailleur, and optionally electric cables external to the frame or front end subjects them to being exposed to physical impact and abrasion during bicycle riding, accidents, carrying and lifting, mounting to carriers, locking, cleaning, maintenance and during other activities. Further, externally mounted cables are a hindrance to attaching and using accessories on the bicycle, including water bottles, racks, panniers, electronic devices, locks, and warning bells, etc. Additionally, externally mounted cables add to the overall aerodynamic drag of the bicycle, which is especially important to minimize for road cyclists. To minimize such negative aspects of externally mounted cables, such cables may be routed partially or completely within the frame and front end.

Routing cables through various components of the bicycle complicates the bicycle design. Apertures created in these various components, such as the frame, forks, and headset must be large enough to allow the cables to pass within, but not so large as to weaken the components themselves. For example a blade or leg of a fork that includes a brake-cable-exit aperture may be weaker than the opposite leg, which may not include such an aperture.

Although some solutions exist for routing cables from the handlebars or stem fully or partially internally within a steering (or steerer) tube of a bicycle, these solutions suffer from multitude of negative factors. Some designs, such as those exhibited in U.S. Pat. Nos. 7,566,065; 7,591,474, and 9,096,287, cause the cables to enter through a wall of the steering tube, reducing the structural integrity and load-carrying capacity of the steering tube. Or, these designs route the cables through the top end of the steering tube, which is exposed above the stem, thus increasing the chances of water and dirt intrusion into the steering tube and its associated bearings. Other designs, such as that exhibited by U.S. Pat. No. 7,891,687, require the use of a non-cylindrical and non-standard shaped steering tube, which limits the design from being widely used with a variety of manufacturers that manufacture only standard-shaped steering tubes. Yet further designs, exhibited by US patent publication 2019/0092417A1, include offsetting the axes of the steering tube and the head tube to provide extra space for cable routing. This axis offset, however, causes translation as well as rotation of the steering tube during steering, rather than only the typical rotation when the axes are aligned. Such translation during steering may feel awkward and unnatural to traditional riders. An additional prior solution adds an additional hollow element forward of the head tube, such as shown in U.S. Pat. Nos. 7,976,045 and 8,684,386. This solution is undesirable as it increases the length of the bicycle frame forward of the down tube and creates a gap between the steerer axis and the additional hollow element, increasing aerodynamic drag, among other negative aspects.

Yet a further solution routes the cables through the top of the headset, head tube, and steerer tube assembly. For reference, FIG. 1 illustrates a typical head tube and steering components of a modern bicycle. Generally, a steerer tube 11 is disposed within a head tube 12. The steerer tube 11 is generally an upper component of the front forks (not illustrated), and is coupled to the handlebars (not illustrated). Rotating the handlebars, in turn, rotates the steerer tube 11 and front forks relative to the head tube 12 and allows the rider to steer the bicycle. An upper bearing 10 is held between a bearing cup 9 and a compression ring 8, and provides a bearing function, typically in conjunction with a lower bearing (not illustrated) located near the bottom of the head tube 12. A top cap 6 and o-ring 7 protects the bearing 10 and other internal components from water and dirt intrusion. A nut 3 is fixed to the steering tube 11, through which a cap bolt 1 is threaded. The cap bolt 1 also passes through a stem cap 2. A stem 4 is coupled to the handlebars and sits between the stem cap 2 and the top cap 6. A spacer 5 may be used to fill the area between the stem 4 and top cap 6. In assembly, as the stack of components is drawn together by tightening the stem cap bolt 1 through the stem cap 2, the top cap 6 contacts the compression ring 8. The compression ring 8 works in conjunction with a tapered inner surface of the bearing 10 to apply a radial compressive force 14 against the steerer tube 11, rotationally connecting the bearing 10 to the steerer tube and radially fixing the steerer tube with the bearing 10. Once proper adjustment of the stack has been achieved, the clamping portion of the stem 4 fixes the entire stack of components in place. At the same time, all components are fixed axially.

As mentioned above, some designs route brake and derailleur cables through the top of the headset, head tube, and steerer tube assembly. With reference to FIG. 2A, a portion of a steerer tube 20 is illustrated, as well as a portion of a compression ring or wedge 30 and upper bearing 40. The compression wedge 30 differs from the compression wedge 8 of FIG. 1 in that the compression wedge 30 includes two apertures 34 sized to accept cables, and a land 32 between the two apertures. When tightened against the steerer tube 20, the land 32 creates uneven forces that are transmitted to the steerer tube 20, illustrated as 22, due to the compression wedge 30 having an interrupted inner surface. These uneven forces applied to the steerer tube 20 may cause premature wear or breakage. Steerer tubes made of carbon fiber may be particularly susceptible to damage caused by these uneven forces. With reference to FIG. 2B, these uneven forces may also occur when the outside surface of a compression wedge is interrupted. In this figure, a compression wedge 50 includes two apertures 54 and a land 52 between the apertures. When the compression wedge 50 is compressed against the upper bearing 40, as described above, the land 52 transmits concentrated stresses to the upper bearing, illustrated as 42, which may cause premature wear or damage of the upper bearing.

Embodiments of the disclosure address these and other problems of present-day head tube assemblies with internal cable routing.

BRIEF DESCRIPTION OF THE DRAWINGS

FIG. 1 is a side cutaway view of a known steering assembly and head tube illustrating conventional components.

DETAILED DESCRIPTION

Figure 2B:
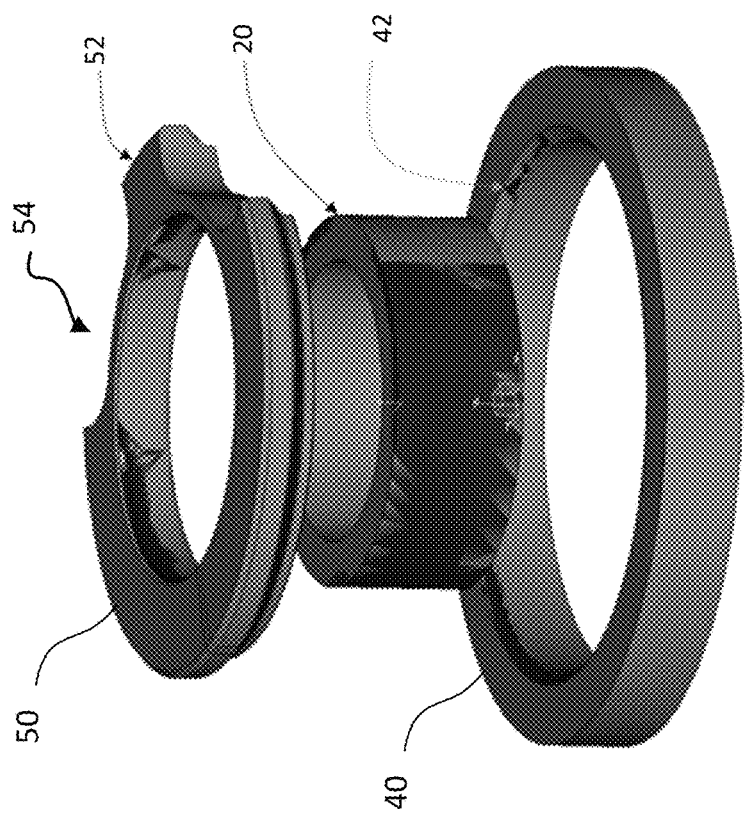
FIG. 2B is a side perspective view of components of another undesirable steering assembly illustrating areas of uneven forces.
Figure 2A:
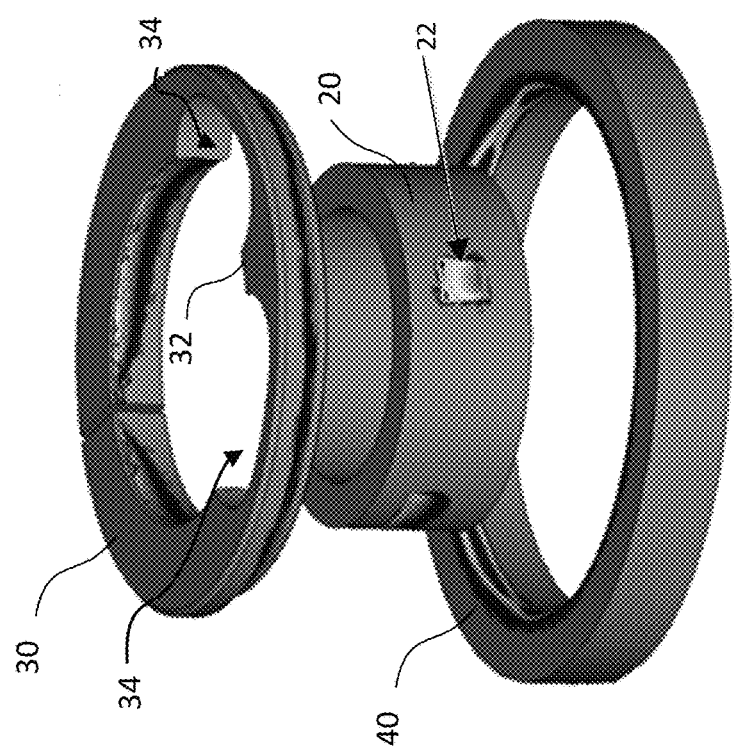
FIG. 2A is a side perspective view of components of an undesirable steering assembly illustrating areas of uneven forces.
Figure 3:
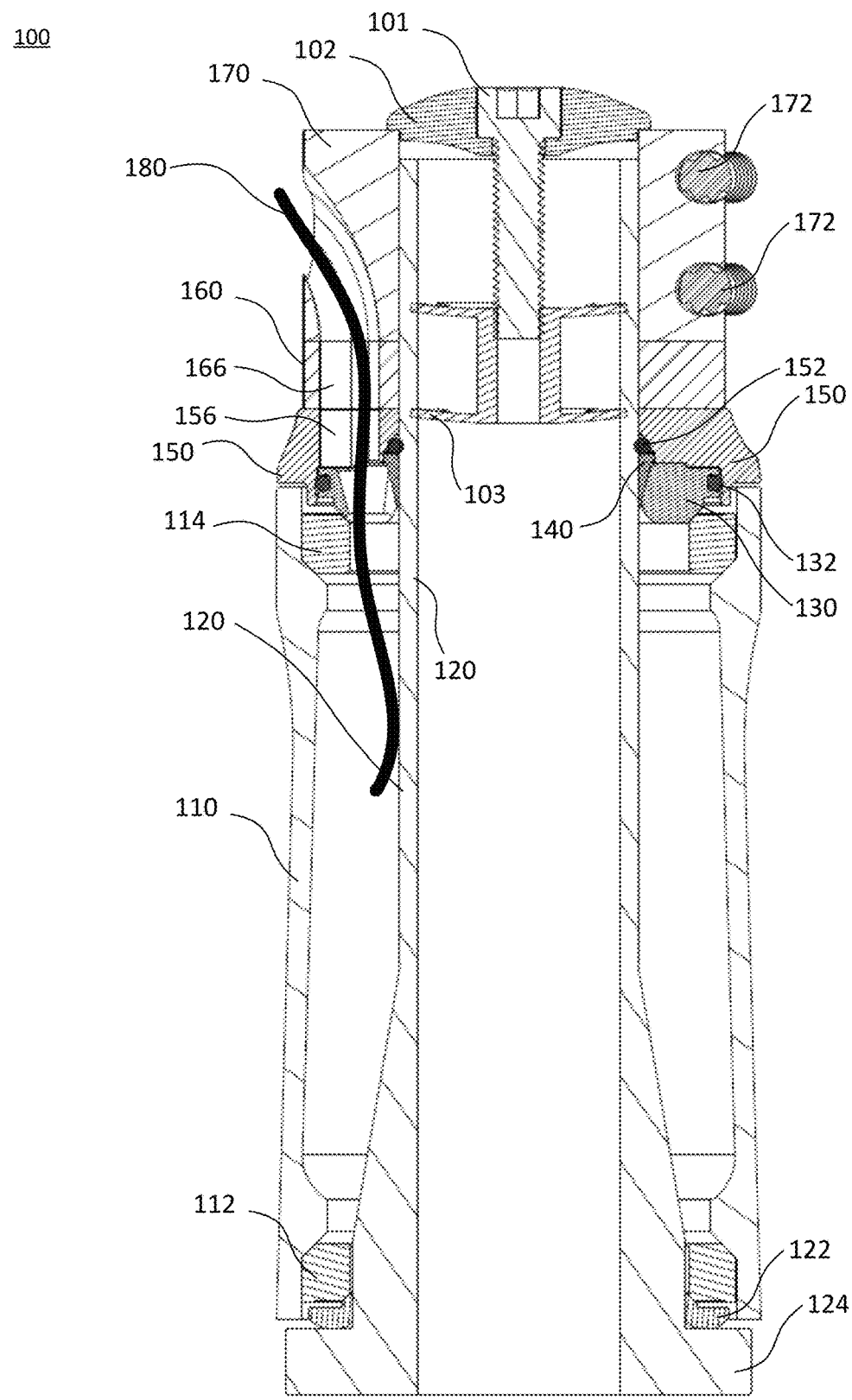
FIG. 3 is a side view of a steering bearing assembly having internal cable routing according to embodiments of the invention.

FIG. 3 is a side view of a steering assembly 100 having internal cable routing according to embodiments of the invention. The front end assembly includes a head tube 110, which is stationary relative to a bicycle frame. Although the description of the steering assembly 100 is provided with reference to bicycle components, embodiments of the invention may instead be used in tricycles or other vehicles having actuator cables routed through a head tube or other similar structure.

The head tube 110 engages and supports outer rings of bearings 112 and 114. The bearing 114 may be referred to as the upper bearing in this disclosure, as it sits relatively higher in the head tube 110 than does the bearing 112. For the same reasons, the bearing 112 may be referred to as the lower bearing. Either or both bearings 112, 114 may be located inside bearing cups that sit in the head tube 110.

A steerer tube 120 is an upper element of a fork (not illustrated) that supports the front wheel. The steerer tube 120 passes within the inner rings of bearings 112, 114. As described below, embodiments of the invention secure the steerer tube 120 to the inner ring of the upper bearing 114. Once secured, the bearings 112, 114 allow the steerer tube 120, and the components coupled to the steerer tube 120, such as handlebars, to smoothly rotate relative to the head tube 110. This smooth rotation allows the rider to steer the bicycle. The handlebars may be coupled to a stem 170, and one or more spacers 160 may be used to span any gaps in the steering assembly. In general, in FIG. 3, the only stationary parts relative to the bicycle frame are the head tube 110 and the outer rings of bearings 112, 114. The other components illustrated in FIG. 3 rotate relative to the head tube 110 through the action of bearings 112, 114.

The fork also includes a baseplate 122, or the baseplate may be integrated into a fork crown 124. When the fork is inserted into the head tube 110, the baseplate 122 or fork crown 124 contacts the lower bearing 112, which limits how far the fork can travel within the head tube 110.

Figure 4:
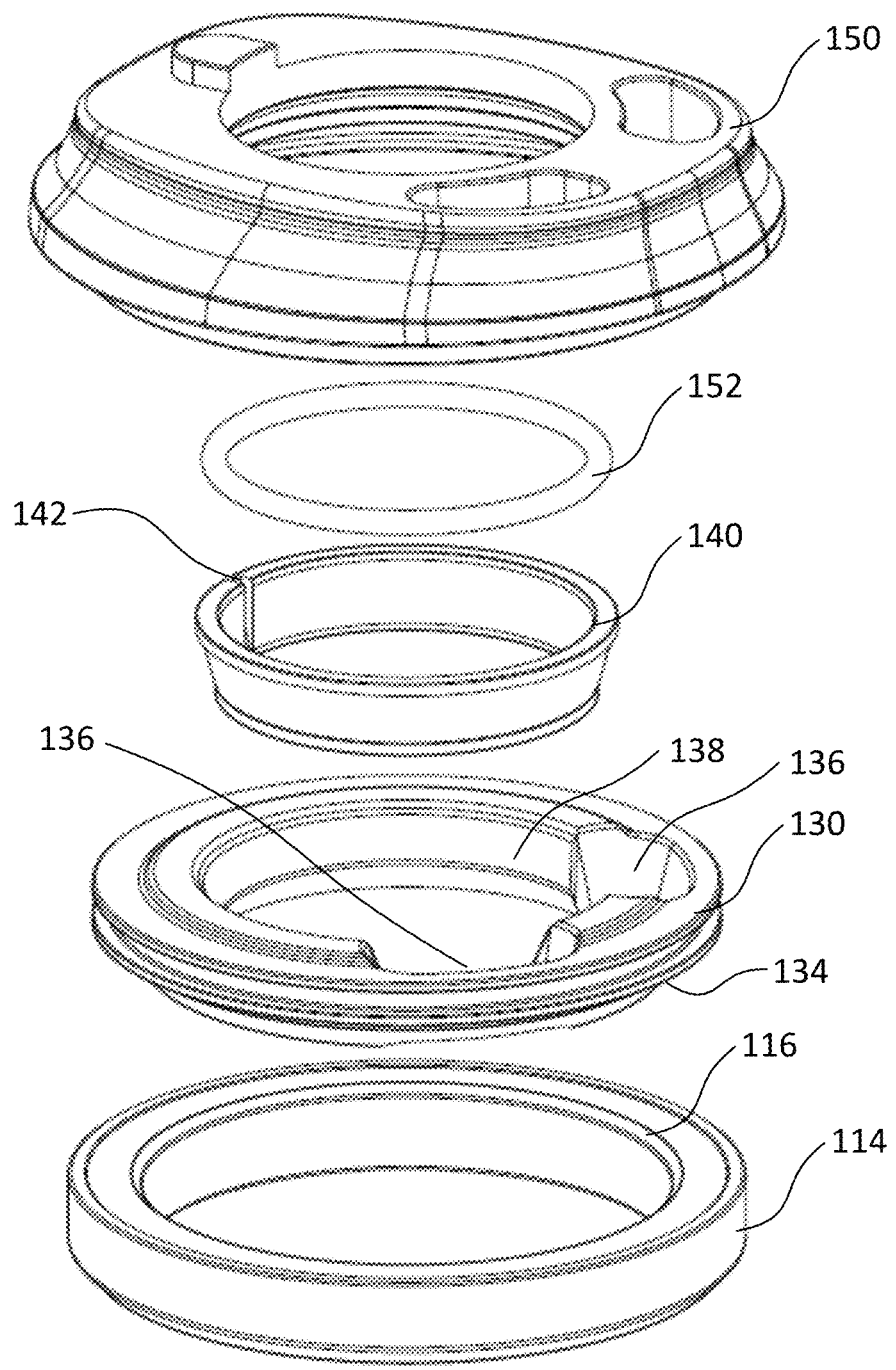
FIG. 4 is an exploded view of some components included in the embodiment of FIG. 3, according to embodiments of the invention.
Figure 5:
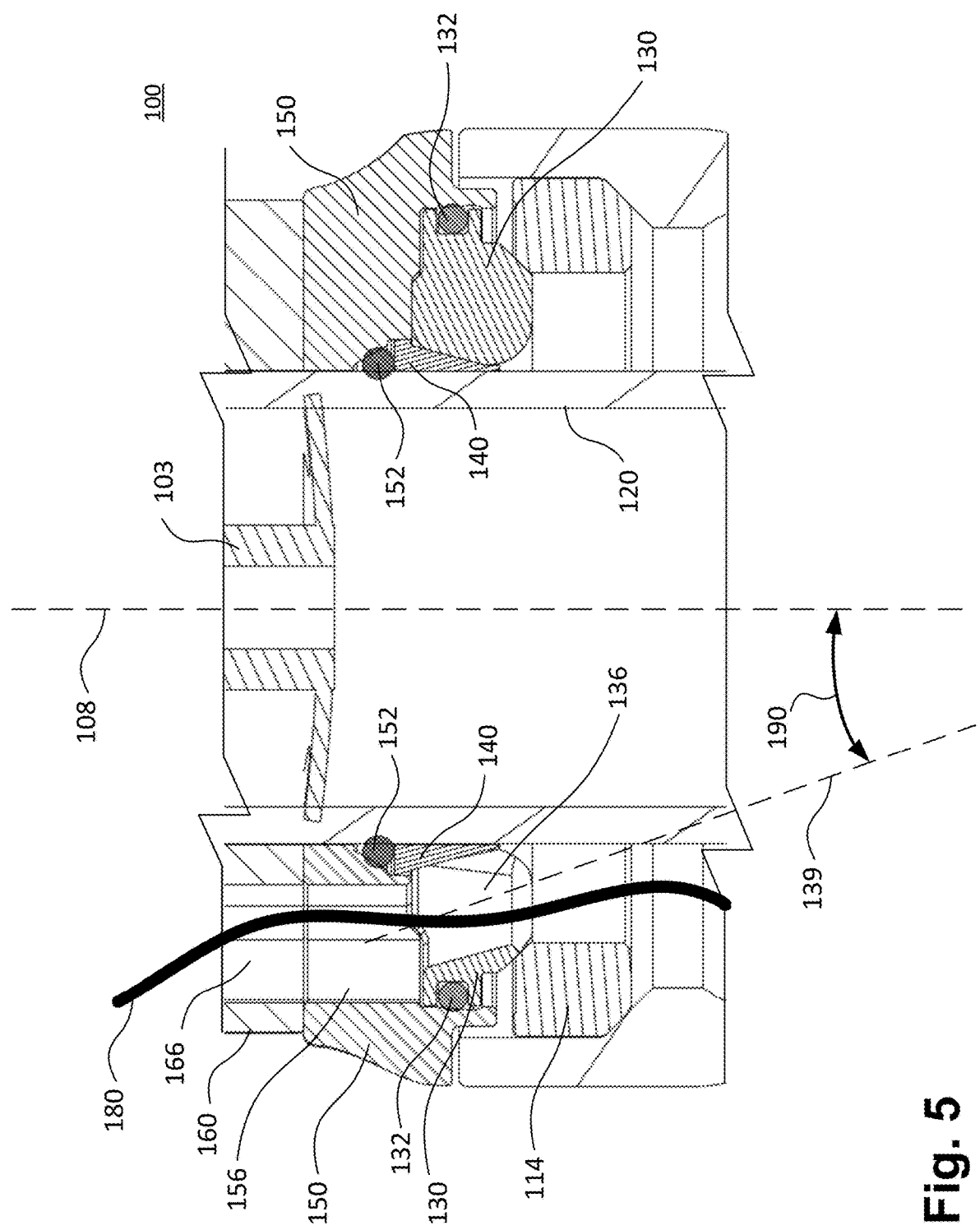
FIG. 5 is a detailed view of a portion of FIG. 3 illustrating components for internal cable routing, according to embodiments of the invention.

FIG. 4 is an exploded view of several components of the steering assembly 100 of FIG. 3, in isolation, providing a detailed view of the component parts. Illustrated in FIG. 4 are the upper bearing 114 as well as a compression ring 130. A resilient element 152 sits between a top cap 150 and a tapered ring 140. FIG. 5 is a detailed view of a portion of FIG. 3, illustrating the steering assembly components of FIG. 4 as they appear when stem bolt 101 (FIG. 3) is tightened and the component stack is compressed together, securely positioning the components relative to one another.

As best illustrated in FIGS. 4 and 5, the upper bearing 114 includes a beveled surface 116 on its inner ring, which mates with a beveled surface 134 of the compression ring 130 during compression, keeping the compression ring tightly coupled to the inner ring of the upper bearing 114. Also during compression, the tapered ring 140 operates in conjunction with a beveled inner surface 138 of the compression ring 130. The tapered ring 140 includes a slot 142. When the tapered ring 140 and compression ring 130 are compressed together, the beveled inner surface 138 of the compression ring causes the tapered ring 140 to reduce diameter, aided by the slot 142, and create a radial compressive force against the steerer tube 120 (seen in FIG. 5), as described in U.S. Pat. No. 8,662,517, which is incorporated herein by reference.

A top cap 150 covers the tapered ring 140, compression ring 130, and bearing 114, preventing intrusion from dirt and the elements. The resilient element 152 may be formed of any resilient elastomeric material, and configured as a compression spring, elastomeric element, or other biasing component between the top cap 150 and tapered ring 140. Thus, as best illustrated in FIG. 3, as the components of the steering assembly are compressed by tightening the stem bolt 101, the stem cap 102 causes downward pressure to be exerted through the stem 170 and any spacers 160 to the top cap 150. The top cap 150, in turn, compresses the resilient element 152 into the top of the tapered ring 140, which generates the radial compressive force to hold the steerer tube 120, as described above.

FIGS. 3 and 5 also illustrate a path of a cable 180 through components of the steering bearing assembly 100. The cable 180 illustrated in FIGS. 3 and 5 may be shown smaller than it would be in practice, so as not to obscure the components of the steering bearing assembly 100 in the drawings. The cable 180 starts outside of the assembly 100, and is, for instance, coupled to derailleur or brake controls on handlebars. In FIG. 3, the cable 180 passes through an aperture in the stem 170. Then in both FIGS. 3 and 5, the cable 180 is illustrated passing through an aperture 166 of the spacer 160, if such spacer is present. Then the cable 180 passes into an aperture 156 of the top cap 150. In this embodiment the aperture 156 of the top cap 150 is parallel to a main vertical axis 108 of the steering bearing assembly, but other aperture shapes are possible. Next, the cable 180 passes through an aperture 136 of the compression ring 130, and inside the inner ring of the upper bearing 114. At this point, the bicycle manufacturer can route the cable 180 anywhere within the bicycle frame to an exit closer to the desired derailleur or brake.

As seen in FIGS. 4 and 5, the aperture 136 of the compression ring 130 differs from conventional cable-routing apertures, described above, in that a center axis 139 of the aperture 136 is angled from, and specifically not parallel to, the main vertical axis 108 of the steering assembly. This offset angle is illustrated in FIG. 5 as angle 190. In various embodiments, the offset angle 190 may be between approximately 1 and 60 degrees, and, more particularly, between approximately 1 and 35 degrees. In a preferred embodiment, the offset angle 190 may be between 10 and 15 degrees.

Further, as illustrated in FIG. 5, the aperture 136 is tapered, so that the aperture has a larger opening on the top surface of the compression ring 130 than an opening at the bottom surface. When mounted in a regular steering assembly, the top surface of the compression ring 130 is the surface of the compression ring closest the handlebars, while the bottom surface is the surface furthest from the handlebars.

Also, as described and illustrated below, the aperture 136 further includes a force-reducing, or force-canceling, relief or relief structure.

Figure 6:
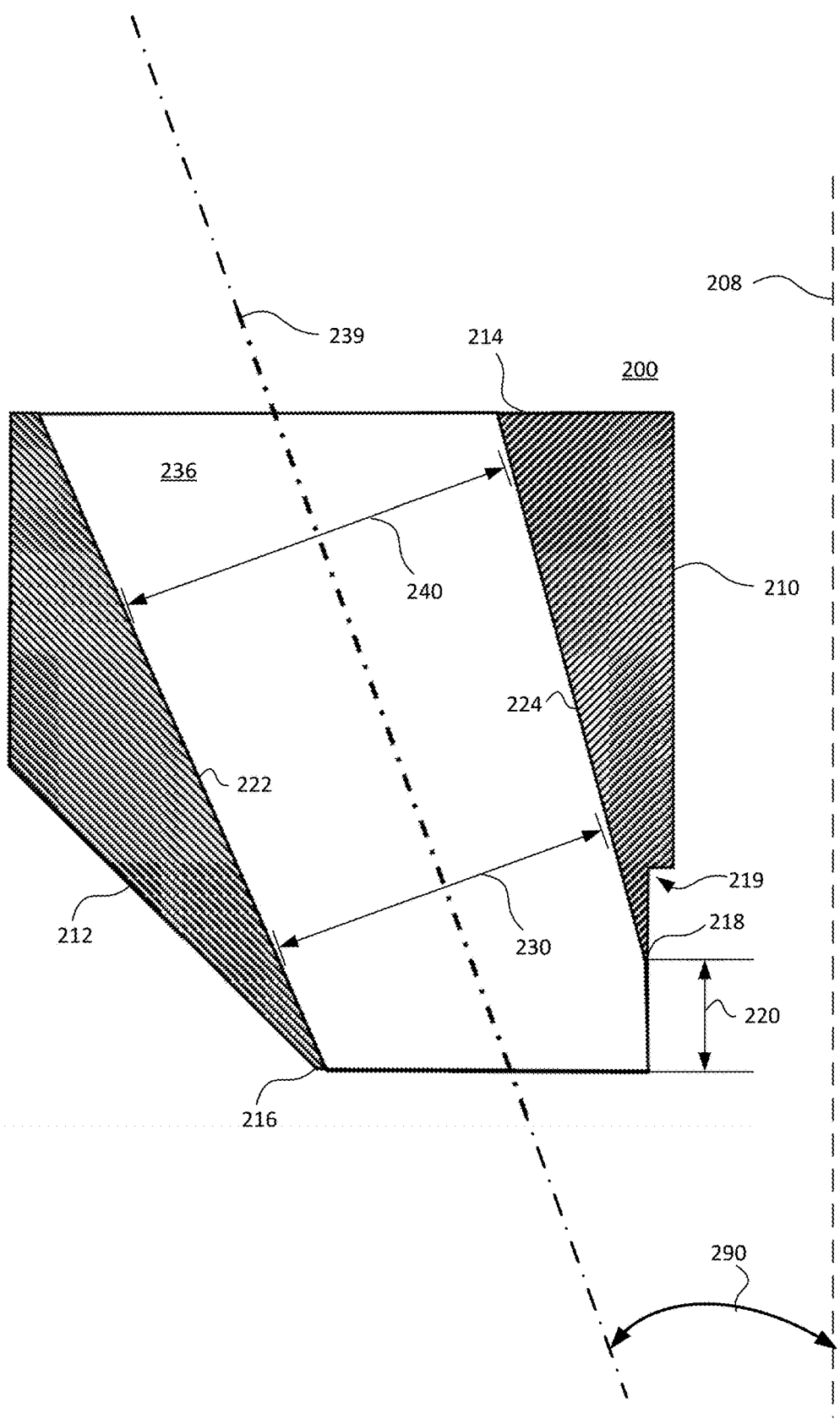
FIG. 6 is a diagram illustrating features of a steering assembly component according to embodiments of the invention.

Each of these features of apertures within components of a steering bearing assembly, according to embodiments of the invention, is illustrated in FIG. 6. This figure is an abstracted cross-section of a steering assembly component according to embodiments of the invention. In FIG. 6, the component may illustrate a compression ring 200, or other component having an aperture 236, through which a cable may pass. The relative dimensions illustrated in FIG. 6 may be exaggerated for purposes of explanation, and may not be to any scale. In this embodiment the compression ring 200 includes a first surface 210, which may contact the steerer tube, and a second surface 212, which may contact the upper bearing. Neither the steerer tube nor the upper bearing is illustrated in FIG. 6. An aperture axis 239 is angled relative to a vertical axis 208 of the steering tube assembly. The angle is represented by incline or offset angle 290, which may be an angle within the range of angles described above with reference to offset angle 190. In the illustrated embodiment of FIG. 6 the aperture axis 239 is constant through the aperture 236, but in other embodiments the aperture 236 may include one or more portions where the aperture is angled differently than other portions. Offsetting the angle 290 relative to the vertical axis 208 allows a larger aperture 236 to be made within the compression ring 200 while still preserving material on both sides of the aperture. With reference to FIG. 6, if the axis 239 of the aperture 236 were parallel to the vertical axis 208, and not offset by the offset angle 290, then either material of the compression ring 200 adjacent the first surface 210 or material of the compression ring adjacent the second surface 212 would be reduced. Accordingly, forming the aperture axis 239 offset to the vertical axis 208 allows the maximum-sized aperture 236 to be formed in the compression ring 200 while also maximizing the amount of material forming the structure of the compression ring. Since the amount and relative layout of material forming the compression ring 200 is directly related to its strength, maximizing the amount of material is important to the design. At the same time, maximizing the size of the aperture 236 of the compression ring 200 is also important, since larger actuator cable apertures provide easier assembly and reduced risk of the actuator cable pinching or rubbing within the steering assembly. Additionally, providing larger cable apertures allow manufacturers a wider selection of cables to choose from for installation into the steering bearing assembly. There is a design trade-off with trying to maximize both the size of the aperture 236 and the amount of material remaining in the compression ring 200 after the aperture is formed. Since consistent cross-sections of material produce more uniform transmitted forces, it is desirable to maintain cross-sections of the material of the compression ring as close to uniform as possible, which embodiments of the invention provide.

In addition to being offset from the vertical axis, the aperture 236 of the compression ring 200 of FIG. 6 is also tapered. The taper is illustrated by a dimension 240, near a top surface 214 of the compression ring 200 having a larger dimension than a dimension 230, near a bottom surface 216 of the compression ring. The aperture 236 may be tapered in one or more orientations. In other words, rather than being a mere widening slot, the aperture 236 may widen in multiple orientations, such as in a cone. Further, the taper of aperture 236 need not be constant in any direction, but may include one or more concave sections or portions, where the amount of taper changes non-linearly. In this disclosure, tapered means that a cross-sectional area of the aperture 236 at one point along its axis 239 has a different cross-sectional area than another point along its axis. Cross-sectional shapes may include, for example, round, square, slot-shaped, radial slot-shaped, or any other cross-section shape suitable for the application. In the embodiment illustrated in FIG. 4, the aperture 136 is formed by a truncated cone sweeping a circular path forming a hole in the solid compression ring 130 that makes for an overall shape that is wider at the top than the bottom, and allows two common bicycle cables to pass through the aperture. The aperture 136 is generally wider than it is deep. In this embodiment, the 'width' of aperture 136 follows a circular path parallel to the outer circumference of the compression ring 130, and has a 'depth' that is measured perpendicular to the width. In other embodiments an aperture in the compression ring or other component of the steering tube assembly may have a different shape than that illustrated in FIG. 4, such as being wider, thinner, having a different radial path, having more or less vertical axis offset, etc. In some embodiments the aperture may be sized to hold only a single common bicycle cable. Further, any number of apertures may be present in the compression ring 200.

In general, the aperture 236 of FIG. 6 is formed so that the cross-sectional area near the top surface 214 of the compression ring 200 is larger than the cross-sectional area near the bottom surface 216. But, in other embodiments the taper may be inverted. Including a tapered aperture 236 in the compression ring 200 or other component of the steering bearing assembly provides improved routing of actuator cables during assembly, among other advantages.

The compression ring 200 includes another feature in its aperture 236, which is a force canceling relief. This relief is illustrated as a dimension 220, which indicates, relative to a bottom surface 216 of the compression ring 200, where an inner portion of the aperture 236 ends, while the outer portion of the aperture 236 continues to the bottom surface 216. By including such relief, a cable positioned within the aperture is not as constrained at the bottom of the aperture 236 as it would be were the relief not present. The amount of relief is controllable in the design stage or the production stage, whenever it is determined how much material to remove from an inner portion of the aperture 236. In the illustrated embodiment, the amount of relief is indicated as dimension 220. The amount of relief may also be controlled by determining the amount of offset angle 290 relative to the vertical axis 208. A greater offset angle 290 would produce more relief, i.e., the dimension 220 would increase, while a lesser offset angle would diminish the amount of relief. An amount of relief is also controllable by removing an amount of material from a lower portion of the surface 210, which is the inner surface of the compression ring, to form a notch 219. Including the notch allows the surface 210 to uniformly hold the steerer tube (not illustrated) along its entire inner surface. If the notch 219 were not present, the inside edge of aperture 236 that includes relief would cause a discontinuous amount of material of the compression ring 200 to grip the steerer tube compared to portions of the compression ring away from aperture 236. This discontinuity could create uneven forces when the compression ring 200 grips the steerer tube. Another way to create relief in an aperture is presented FIG. 5. In FIG. 5, due to the geometries of the compression ring 130 and the tapered wedge 140 when assembled in the steering bearing assembly, the lowest portion of the tapered wedge 140 sits higher than the lowest portion of a lowest edge of the portion of the aperture 136 made by the compression ring 130. This difference in height, when fully assembled, creates the same or similar relief dimension 220 as illustrated in FIG. 6.

In this disclosure, relief can mean that one portion of the aperture 236 has an aperture length that is different than another portion of the aperture. For example, in FIG. 6, an outer edge 222 of the aperture 236 is longer than an inner edge 224 of the aperture. Including relief in the aperture of the compression ring 200 or other component of the steering bearing assembly provides improved routing of actuator cables during assembly, among other advantages.

Figure 7A:
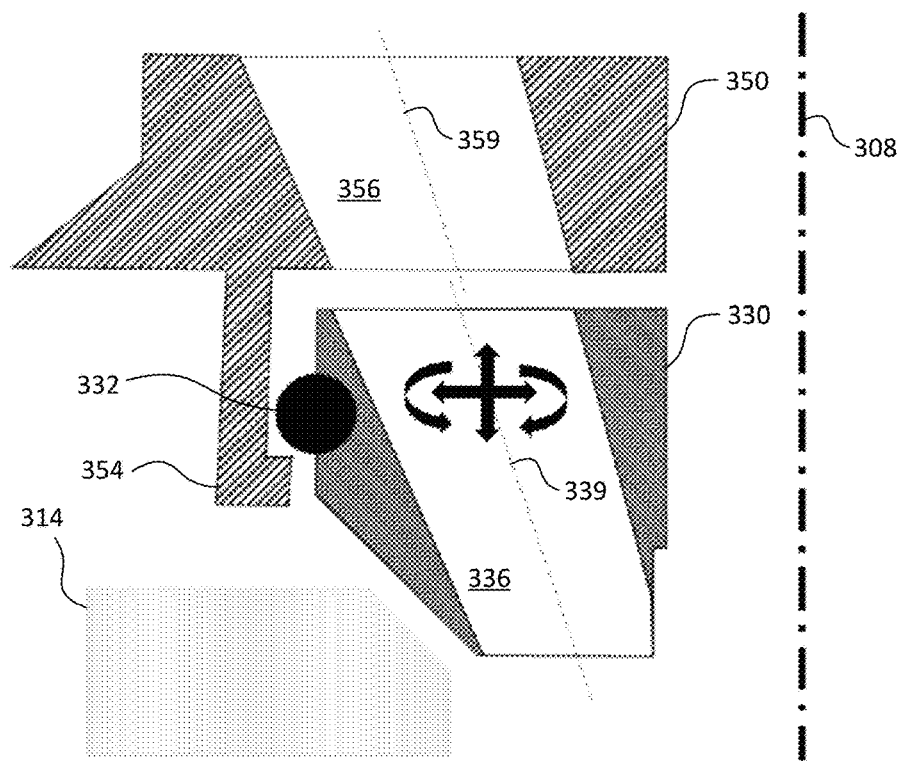
FIG. 7A is a diagram illustrating components of a steering bearing assembly before tightening according to embodiments of the invention.
Figure 7B:
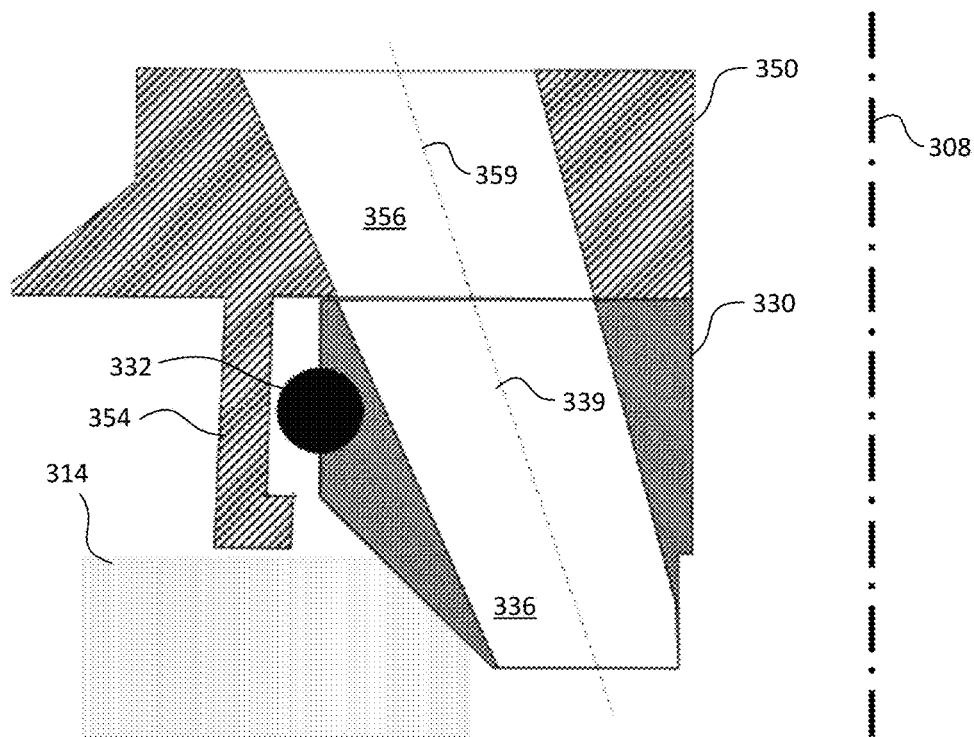
FIG. 7B is a diagram illustrating the components illustrated in FIG. 7A after being tightened, according to embodiments of the invention.

FIGS. 7A and 7B illustrate how embodiments of the invention may translate and rotate relative to one another in a controlled manner during assembly. In these figures, a top cap 350 includes a detent or lip 354. A compression ring 330, which may be an example of the compression ring 200 of FIG. 6 or other compression rings described herein includes a retention element 332, which may be embodied by an o-ring. In a first stage of assembly, illustrated in FIG. 7A, the compression ring 330 has been inserted into the top cap 350, and loosely retained by the lip 354. Note that the o-ring 332 is pliable and deformed while being inserted past the lip 354 of the top cap 350. Other methods of loosely retaining the compression ring 200 within the top cap 350 are also possible. For instance, one or more set screws could be formed within the top cap 350 and controllably threaded into a compression ring, or into a threaded tab or nut that interferes with an edge of the compression ring and controls its vertical position relative to the top cap. In other embodiments the lip 354 may deflect around a hard lip or other structure on an outside surface of a compression ring. In another embodiment a snap ring could loosely hold a compression ring within the top cap 350.

Once assembled as illustrated in FIG. 7A, the compression ring 330 may rotate and/or translate relative to the top cap 350. This relative movement allows the assembler to line up an axis 359 of the top cap 350 to an axis 339 of the compression ring 330. Apertures 336 and 356 may also be aligned in this first stage of assembly. Once aligned, the assembler may route cables through the apertures 336 and 356, or the assembler may wait until after stage two of assembly before routing cables. The assembler proceeds to stage two of assembly by tightening stem bolt 101 (FIG. 3), as described above. This compresses the top cap 350, compression ring 330 and an upper bearing 314 tightly together, as described above and as illustrated in FIG. 7B.

Figure 8:
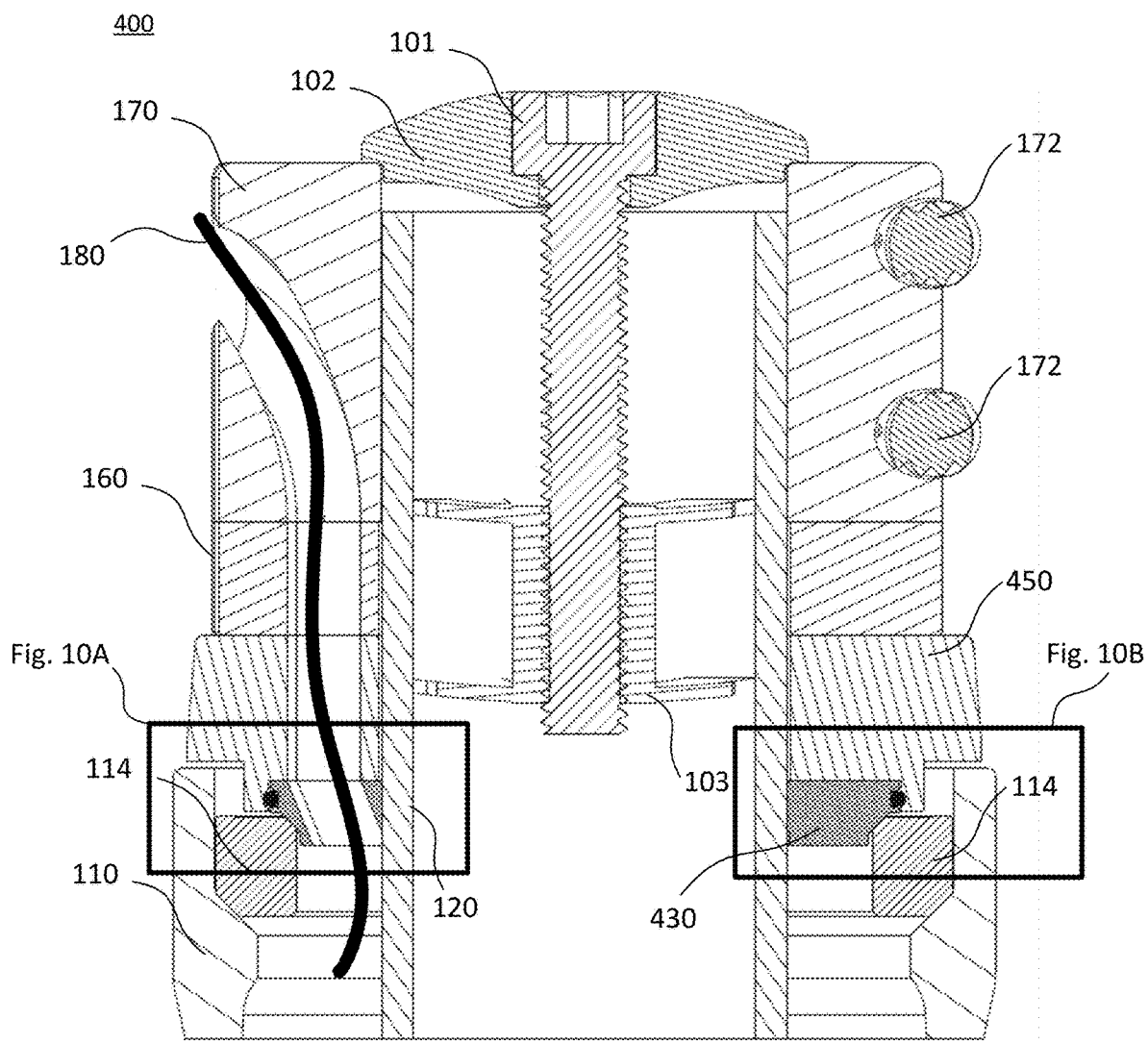
FIG. 8 is a side view of another steering bearing assembly having internal cable routing according to embodiments of the invention.
Figure 9:
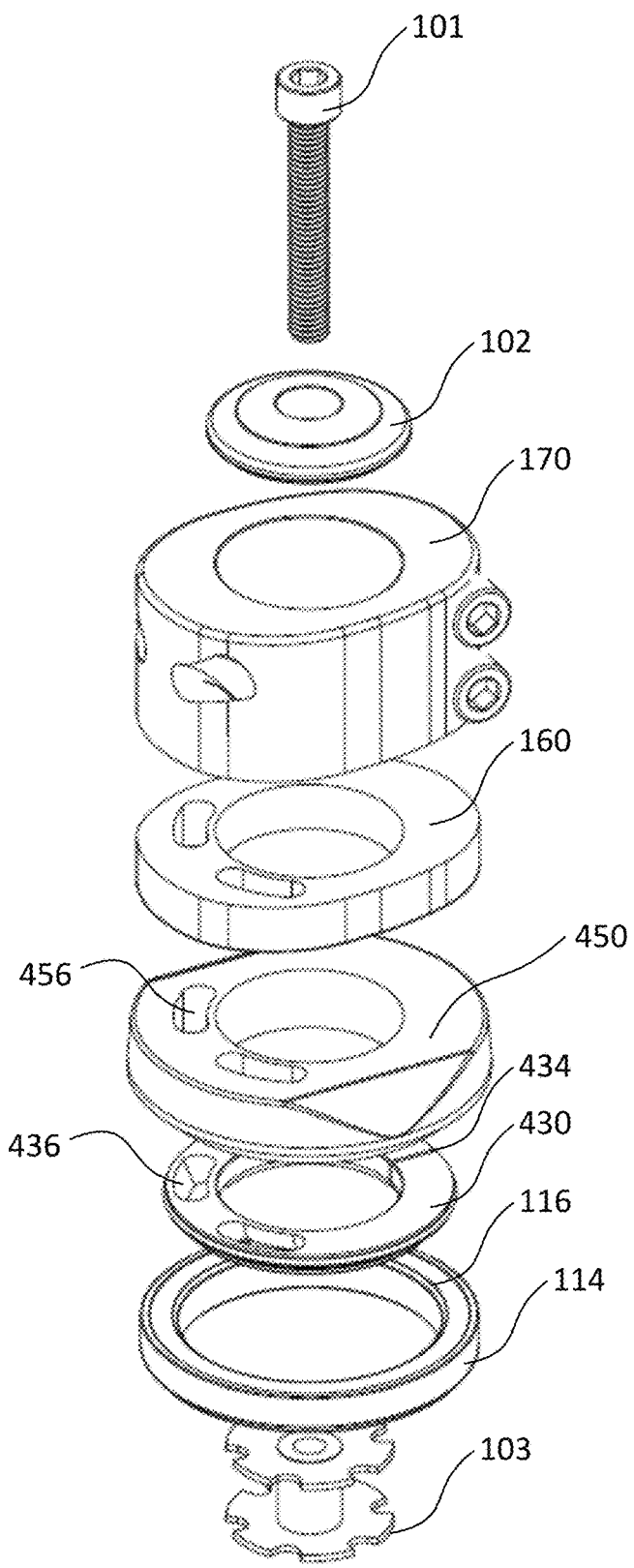
FIG. 9 is an exploded view of some components included in the embodiment of FIG. 8, according to embodiments of the invention.

FIG. 8 is a side view of another steering bearing assembly 400 having internal cable routing according to embodiments of the invention, and FIG. 9 is an exploded view illustrating components of the steering bearing assembly 400 in isolation. The steering bearing assembly 400 is similar to the steering bearing assembly 100 described with reference to FIG. 3 above. The description of same or similar components or features common between the two assemblies 100, 400 is omitted for brevity. Instead, differences between the assemblies 100, 400 are described.

Figure 10B:
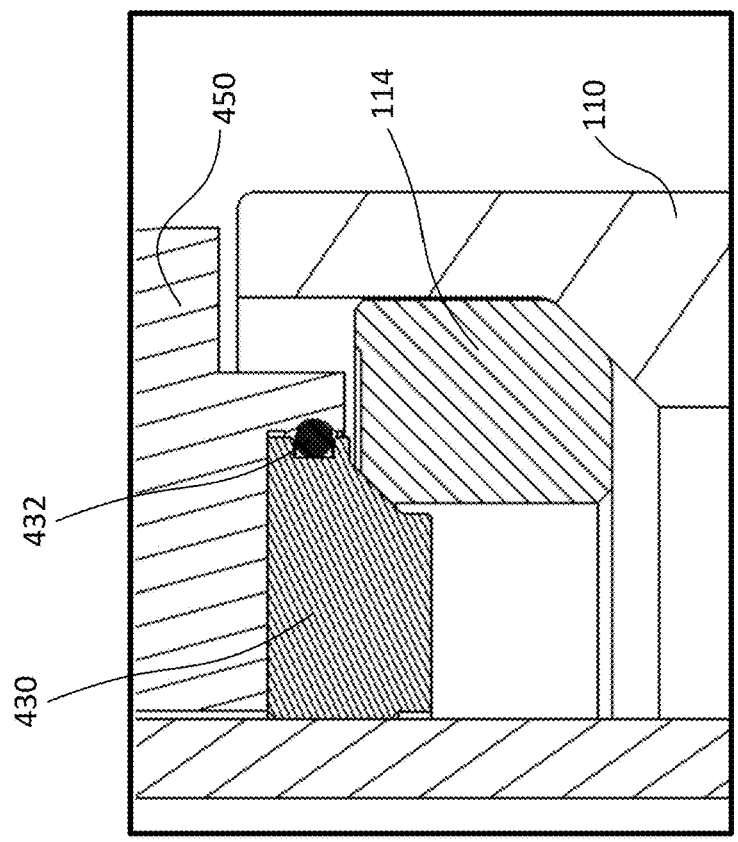
FIGS. 10A and 10B are detailed views of respective portions of FIG. 8 illustrating components for internal cable routing, according to embodiments of the invention.
Figure 10A:
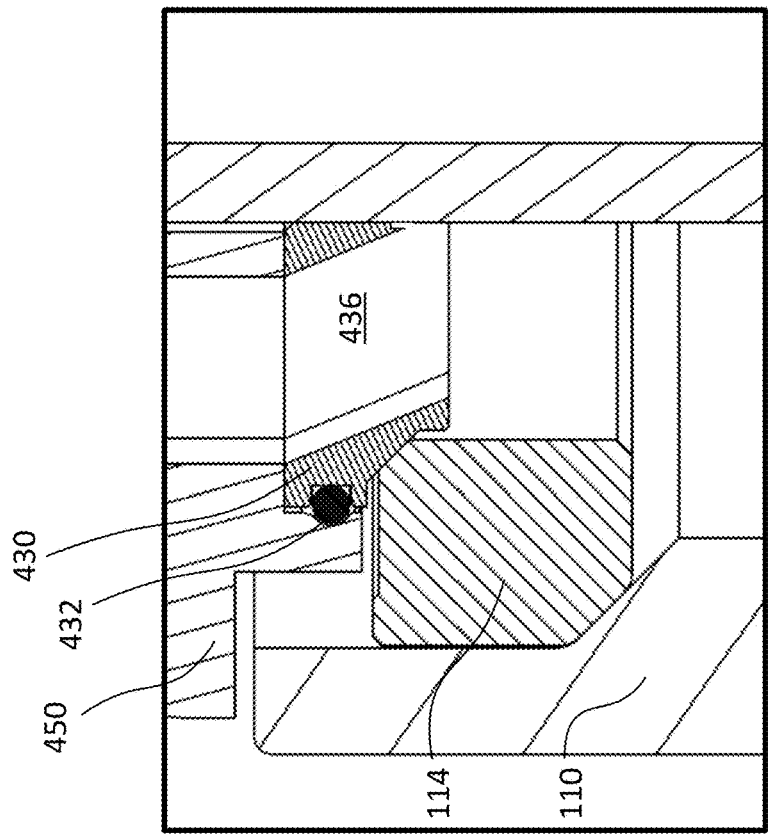

The differences between assemblies 100 and 400 is best seen with reference to FIGS. 9, 10A, and 10B. As revealed in these figures, the main differences are that a split compression wedge or ring 430 replaces the function of both the compression ring 130 component and the tapered ring 140 component of the assembly 100. The compression ring 430 includes a slot 434, which performs a function similar to the slot 142 in the tapered ring 140 described above. Meaning, when the stack of components from FIG. 9 are compressed, the tapered surface 116 of the bearing 114 interfaces with a lower surface of the split compression ring 430. This compression, due to the action of the slot 434, reduces the diameter of the split compression ring 430, allowing it to tightly grip the steerer tube (not illustrated). The split compression ring 430 includes apertures 436 which may be sized and shaped as described above with apertures 136 and 236.

A top cap 450 interfaces with the split compression ring 430. As illustrated in FIGS. 10A and 10B, the split compression ring 430 may include a retention element 432, such as an o-ring, which cooperates with a lip or recess of the top cap 450 as described above.

Figure 11:
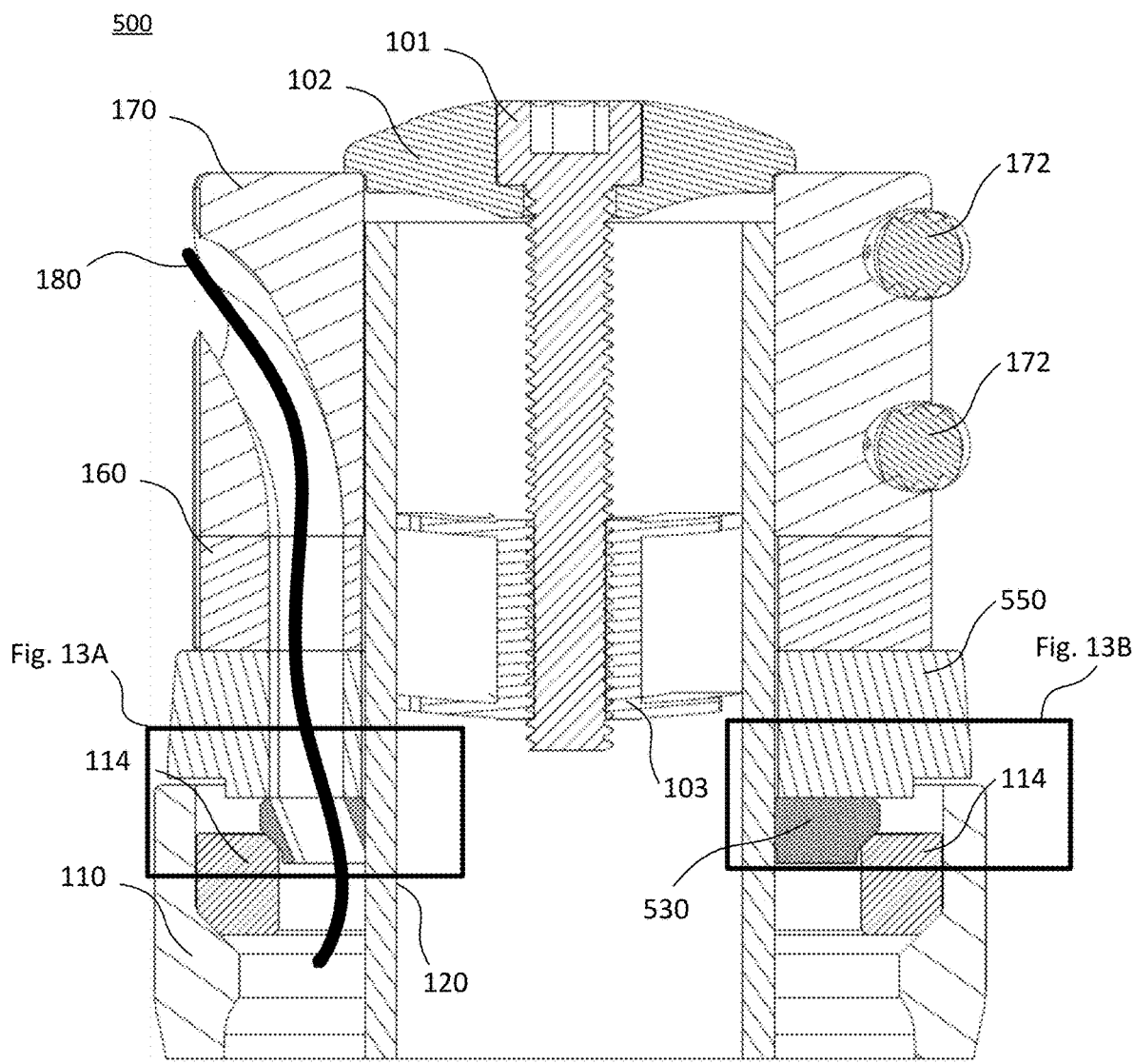
FIG. 11 is a side view of yet another steering bearing assembly having internal cable routing according to embodiments of the invention.
Figure 12:
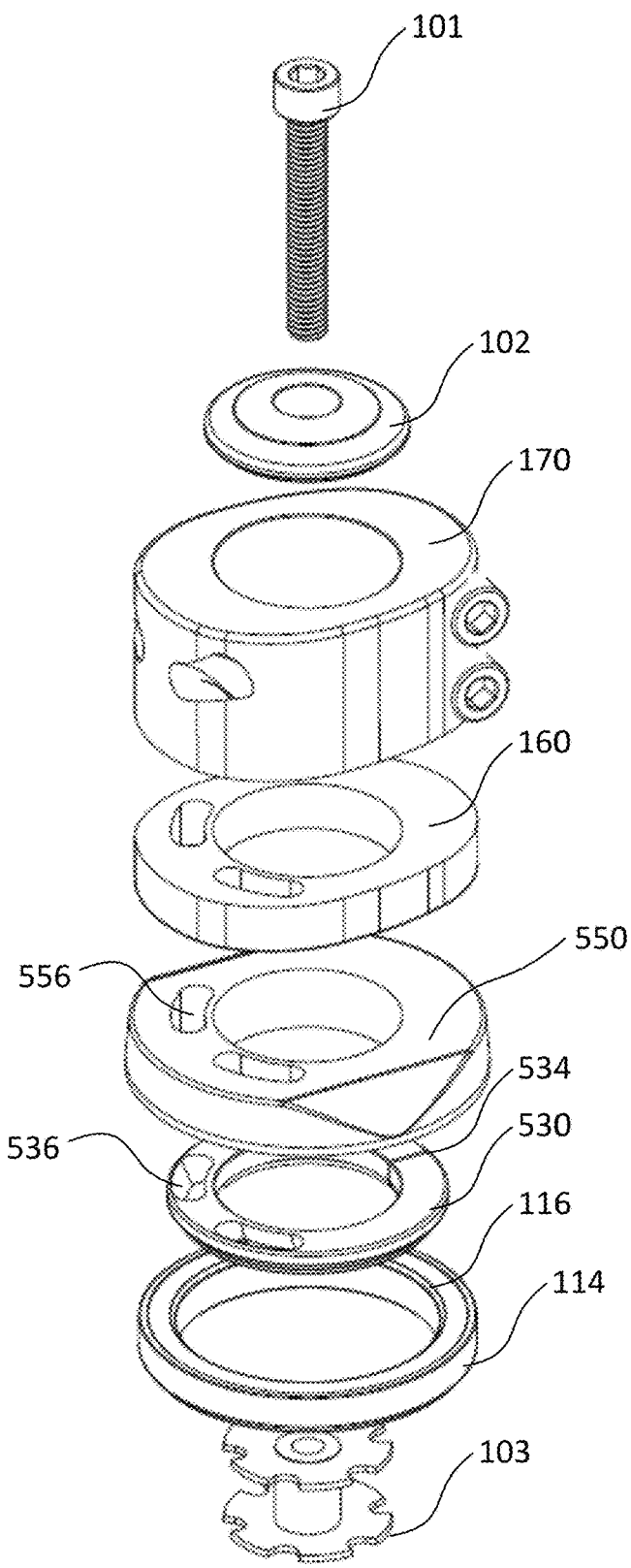
FIG. 12 is an exploded view of some components included in the embodiment of FIG. 11, according to embodiments of the invention.

FIG. 11 is a side view of yet another steering bearing assembly 500 having internal cable routing according to embodiments of the invention, and FIG. 12 is an exploded view illustrating components of the steering bearing assembly 500 in isolation. The steering bearing assembly 500 is similar to the steering bearing assemblies 100 and 400 described above, and the description of same or similar components or features common between the assemblies is omitted.

Figure 13B:
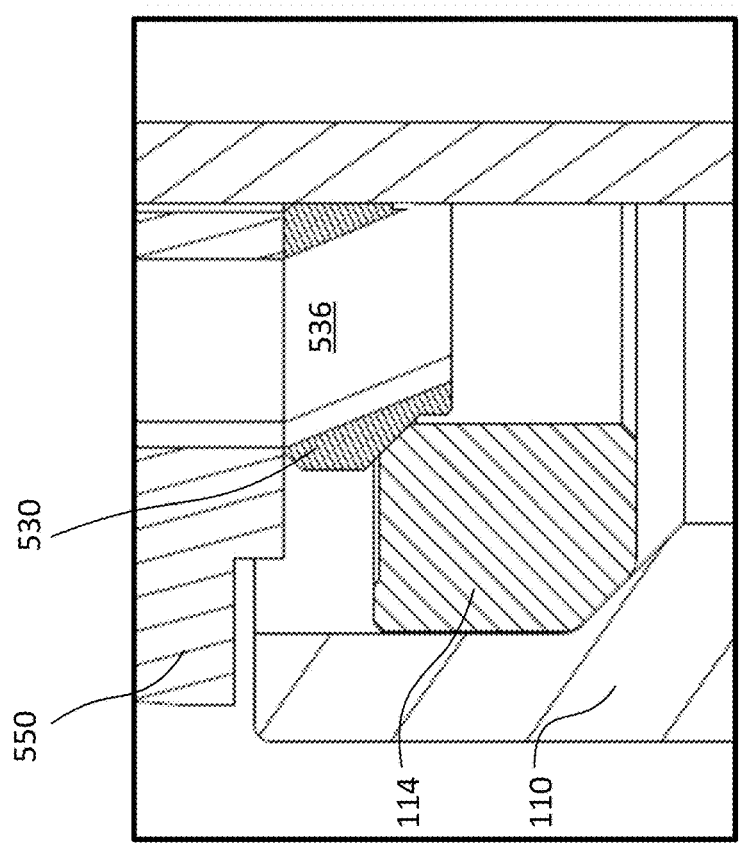
FIGS. 13A and 13B are detailed view of respective portions of FIG. 8 illustrating components for internal cable routing, according to embodiments of the invention.
Figure 13A:
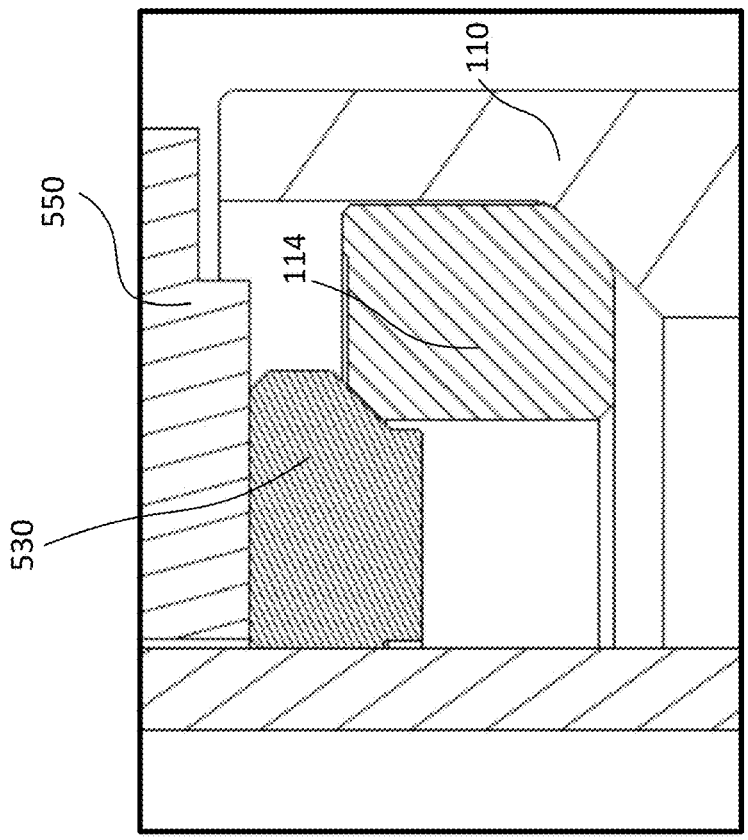

As best seen in FIGS. 12, 13A, and 13B, a split compression wedge or ring 530 is similar in nearly all respects to the compression ring 430, except that compression ring 530 lacks any retention element. Cooperatively, a top cap 550 need not, and does not, include a lip or recess to hold the compression wedge 530 in place. Instead, the compression wedge 530 is held in place in the steering bearing assembly 500 stack as it is compressed by tightening the stem bolt 101 (FIG. 11). This embodiment 500 illustrates that the retention element 432 of the steering bearing assembly 400 is an optional element, and need not be present in all embodiments. The split compression ring 530 includes apertures 536 which may be sized and shaped as described above with apertures 136 and 236.

It should be noted that all of the features of the apertures described above, such as apertures 136, 236, 336, 436, and 536 may be used independent of any of the other features. So, while some apertures according to embodiments of the invention may be inclined, or offset relative to the vertical axis of the steering bearing assembly, this feature is not strictly necessary in all embodiments. Similarly, while some apertures according to embodiments of the invention may be tapered, this feature, too, is not strictly necessary in all embodiments. Further, some apertures according to embodiments of the invention may include a force-canceling relief feature, yet this feature also is not strictly necessary in all embodiments. Also, although the apertures were mostly described with reference to compression rings, any aperture in any component of the steering bearing assembly may include any or all of the aperture features described herein, in any combination. For example an aperture in a compression ring may have an axis that is not parallel to the vertical axis, while an aperture in a top cap or spacer may include a tapered shape. In short, any of the features described herein may be combined with any other features described herein, for any aperture of any component in the steering bearing assembly. Further, any of the components described herein may be combined into a single component performing the same or similar functions. Also, any of the components described herein may be divided into multiple components performing the same or similar functions.

Although the figures described herein illustrate a specific number of apertures, embodiments of the invention may include more or fewer apertures than those depicted herein. In components having more than one aperture, each aperture may be sized, and/or shaped differently from other apertures, even in the same component.

In the embodiments described above, it may be noted that the inside and outside surfaces of the compression rings, such as compression rings 430 and 530, are continuous or effectively continuous. This means that, other than slots 534 and 434, both the outside and inside surfaces contact their mating surfaces without interruption. Thus, an inclined bottom surface of compression rings 430 and 530 contacts the beveled surface 116 of the upper bearing 114 in all areas, and there are no areas of this junction that are without contact. Since the compression rings 430, 530, reduce diameter during compression, even the slots 434 and 534 close during this compression allowing continuous or nearly continuous contact. This continuous or nearly continuous contact translates to a uniform or nearly uniform force being applied to the upper bearing 114. Similarly, the inner surface of the compression rings 430 and 530 are continuous, other than the slots 434, 534. And, during compression, the inner surface applies a uniform or near uniform force to the steering tube 120 (FIG. 3, for instance). Furthermore, it is noted that the inclined surface 134 of the compression ring 130 (FIG. 4) is fully continuous, and formed without a slot. And, while the inside surface 138 of the compression ring 130 is discontinuous, the continuity function missing from this inside surface 138 is performed by the effectively continuous inner surface of the tapered ring 140. Thus, the combination of components 130, 140, includes a fully continuous outer surface and a continuous or effectively continuous inner surface. The actual size of slots 142 (FIG. 4), 434 (FIG. 9) and 534 (FIG. 12) formed in their respective components may vary depending on the application. In most embodiments, it is desirable to have the slot be of minimum size when the component is tightened in the stack. However, if the slot is too narrow, then the component may not be able to reduce diameter enough to fully tighten against the steerer tube. Surface discontinuity occurs when two surfaces are in contact with one another and one surface does not fully contact the second surface across the area of concern. For cylindrical or conical surfaces, the magnitude of a discontinuity can be measured as the percentage of length of a plane section interrupted by the discontinuity.

In some embodiments, after being compressed into place with its mating surface, as described above, the discontinuity caused by the slot of the tapered ring 140, compression ring 430, or compression ring 530 is within approximately 0.02%-5% of its circumferential length, and, more preferably, within approximately 0.02%-2%. In preferred embodiments, the discontinuity caused by the slots is within approximately 0.02%-0.5%.

As used herein, the phrase "continuous" means having a discontinuity of the shape or a discontinuity to the interface with a mating surface of less than 1%. Also as used herein, the phrase "effectively continuous" means having a discontinuity of the shape or a discontinuity to the interface with a mating surface of less than 5%. For example, with reference to FIG. 9, if the compression ring 430 has a discontinuity with steerer tube 120 (FIG. 8) of less than 5%, due to the presence and size of the slot 430, this is considered to be an effectively continuous contact. Also, if the compression ring 430 has a discontinuity with steerer tube 120 that is less than 1%, due to the presence and size of the slot 430, this is considered to be a continuous contact.

Materials used for the components described herein may be selected based on implementation, and may include turned aluminum, die-cast aluminum, steel, carbon fiber, ceramic materials, fiberglass, and injection molded plastic, for example.

The previously described versions of the disclosed subject matter have many advantages that were either described or would be apparent to a person of ordinary skill. Even so, all of these advantages or features are not required in all versions of the disclosed apparatus, systems, or methods. All features disclosed in the specification, and all the steps in any method or process disclosed, may be combined in any combination, except combinations where at least some of such features and/or steps are mutually exclusive. Each feature disclosed can be replaced by alternative features serving the same, equivalent, or similar purpose, unless expressly stated otherwise.

Additionally, this written description makes reference to particular features. It is to be understood that the disclosure in this specification includes all possible combinations of those particular features. For example, where a particular feature is disclosed in the context of a particular aspect or embodiment, that feature can also be used, to the extent possible, in the context of other aspects and embodiments.

Also, when reference is made in this application to a method having two or more defined steps or operations, the defined steps or operations can be carried out in any order or simultaneously, unless the context excludes those possibilities.

Furthermore, the term "comprises" and its grammatical equivalents are used in this application to mean that other components, features, steps, processes, operations, etc. are optionally present. For example, an article "comprising" or "which comprises" components A, B, and C can contain only components A, B, and C, or it can contain components A, B, and C along with one or more other components.

Also, directions such as "vertical," "horizontal," "right," "left," "upward," and "downward" etc., are used for convenience and in reference to the views provided in figures. But the steering bearing assembly and components thereof may have a number of orientations in actual use. Thus, a feature that is vertical, horizontal, to the right, or to the left in the figures may not have that same orientation or direction in actual use.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

Although particular embodiments of the present invention have been illustrated and described, those skilled in the art will recognize that various other changes, modifications, additions and deletions may be made in structural form and functional detail without departing from the spirit and scope of the invention. As such, it is intended that the foregoing detailed description be regarded as illustrative rather than limiting, and that the scope of the invention be defined solely by the claims contained herein.

We claim:

1. A steering bearing assembly for insertion into a head tube and structured to grip a steering tube disposed within the head tube, the steering bearing assembly comprising:
   a compression ring having a first continuous surface structured to contact an inner ring of a bearing and having a second continuous surface structured to contact the steering tube; and
   one or more apertures fully formed between the first continuous surface and the second continuous surface of the compression ring, the one or more apertures having an aperture axis that is offset from a vertical axis of the head tube, and in which at least one of the one or more apertures is tapered.

2. The steering bearing assembly of claim 1, in which the first continuous surface of the compression ring is a beveled surface structured to mate with a beveled surface of the inner ring of the bearing.

3. The steering bearing assembly of claim 1, in which the compression ring includes a slot.

4. The steering bearing assembly of claim 1, in which at least one of the one or more apertures includes a relief structure.

5. The steering bearing assembly of claim 4, in which the relief structure includes a notch formed in material that forms the second continuous surface of the compression ring.

6. The steering bearing assembly of claim 1, in which the one or more apertures are sufficiently sized to receive one or more bicycle cables therethrough.

7. The steering bearing assembly of claim 1, further comprising a top cap mounted adjacent to the compression ring, the top cap including one or more apertures.

8. A method of installing a steering bearing assembly into a head tube having a steering tube disposed within, the method comprising:
   positioning, within the head tube, a first continuous surface of a compression ring to contact an inner ring of a bearing;
   positioning the steering tube to be proximate a second continuous surface of the compression ring; and
   routing one or more cables through one or more apertures fully formed between the first continuous surface and the second continuous surface of the compression ring, the one or more apertures having an aperture axis that is offset from a vertical axis of the head tube, and in which at least one of the one or more apertures is tapered.

9. The method of installing a steering bearing assembly of claim 8, in which at least one of the one or more apertures includes a relief structure.

10. The method of installing a steering bearing assembly of claim 8, further comprising positioning a top cap adjacent to the compression ring, and in which the top cap includes one or more apertures.

11. The method of installing a steering bearing assembly of claim 10, further comprising aligning the one or more apertures of the top cap to the one or more apertures of the compression ring before routing one or more cables through the one or more apertures of the compression ring.

\* \* \* \* \*